(12) United States Patent
Haydock et al.

(10) Patent No.: US 6,849,982 B2
(45) Date of Patent: Feb. 1, 2005

(54) TOROIDAL ELECTRICAL MACHINE AND AN ANNULAR WINDING CARRIER THEREFOR

(75) Inventors: Lawrence Haydock, Peterborough (GB); Nazar Al-Khayat, Rutland (GB); Stephen Frederick Allen, Stamford (GB); John Ernest Clive Bean, Bourne (GB); Neil Lovell Brown, Holbeach (GB); Jeremy Owen Dowdall, Rutland (GB); Cleveland Mills, Bourne (GB)

(73) Assignee: Newage International Limited, Stamford (GB)

( * ) Notice: Subject to any disclaimer, the term of this patent is extended or adjusted under 35 U.S.C. 154(b) by 0 days.

(21) Appl. No.: 10/476,635

(22) PCT Filed: May 2, 2002

(86) PCT No.: PCT/GB02/02015
§ 371 (c)(1),
(2), (4) Date: Oct. 31, 2003

(87) PCT Pub. No.: WO02/089292
PCT Pub. Date: Nov. 7, 2002

(65) Prior Publication Data
US 2004/0145270 A1 Jul. 29, 2004

(30) Foreign Application Priority Data
May 2, 2001 (GB) .............................................. 0110783
May 2, 2001 (GB) .............................................. 0110784

(51) Int. Cl.[7] ........................... H02K 3/46; H02K 21/24
(52) U.S. Cl. .................. 310/164; 310/45; 310/156.32; 310/156.36; 310/194; 310/254
(58) Field of Search ....................... 310/45, 89, 156.32, 310/156.36, 194, 254, 268, 164

(56) References Cited

U.S. PATENT DOCUMENTS

| | | | |
|---|---|---|---|
| 3,082,337 A | 3/1963 | Horsely ....................... 310/179 |
| 3,283,190 A | * 11/1966 | Applegate ................... 310/162 |
| 4,080,543 A | 3/1978 | Takahashi et al. .......... 310/213 |
| 4,228,378 A | * 10/1980 | Humbert ...................... 310/268 |
| 4,818,911 A | * 4/1989 | Taguchi et al. ............. 310/259 |
| 5,142,181 A | * 8/1992 | Newell ........................ 310/268 |
| 5,334,898 A | 8/1994 | Skybyk ....................... 310/268 |
| 5,440,185 A | 8/1995 | Allwine, Jr. ................ 310/156 |
| 5,717,273 A | * 2/1998 | Gulbrandson et al. ...... 310/260 |
| 5,723,933 A | 3/1998 | Grundl et al. .............. 310/266 |
| 5,977,679 A | * 11/1999 | Miller et al. ................ 310/164 |
| 5,977,684 A | * 11/1999 | Lin .............................. 310/268 |
| 6,181,041 B1 | * 1/2001 | Nose ........................... 310/164 |
| 6,531,799 B1 | * 3/2003 | Miller ......................... 310/114 |
| 6,700,271 B2 | * 3/2004 | Detela ......................... 310/164 |

FOREIGN PATENT DOCUMENTS

| | | | | |
|---|---|---|---|---|
| DE | 44 04 585 A1 | 8/1995 | ........... H02K/3/12 |
| EP | 1 009 092 A2 | 6/2000 | .......... H02K/26/00 |
| JP | 4-364336 | 12/1992 | ............ H02K/3/34 |

* cited by examiner

*Primary Examiner*—Burton Mullins
(74) *Attorney, Agent, or Firm*—Woodard, Emhardt, Moriarty, McNett & Henry LLP

(57) ABSTRACT

A toroidal AC generator includes an outer casing and an annular stator core of ferromagnetic material which is encased in a hollow annular cover of plastics material and which is fixed to the casing between the discs of a twin disc rotor. Each rotor disc carries a circular array of alternately polarised permanent magnets which face the stator core. The hollow annular cover is a two-part moulding and is formed of radially inner and outer ring portions which are joined by circular arrays of radial ribs which extend across the opposed radial faces of the annular core and form open-ended radial passages for the electrical phase windings which are wound around the cover. The ribs project radially beyond the radially outer ring portion and form hooks around which a winding may be retained temporarily during winding.

24 Claims, 15 Drawing Sheets

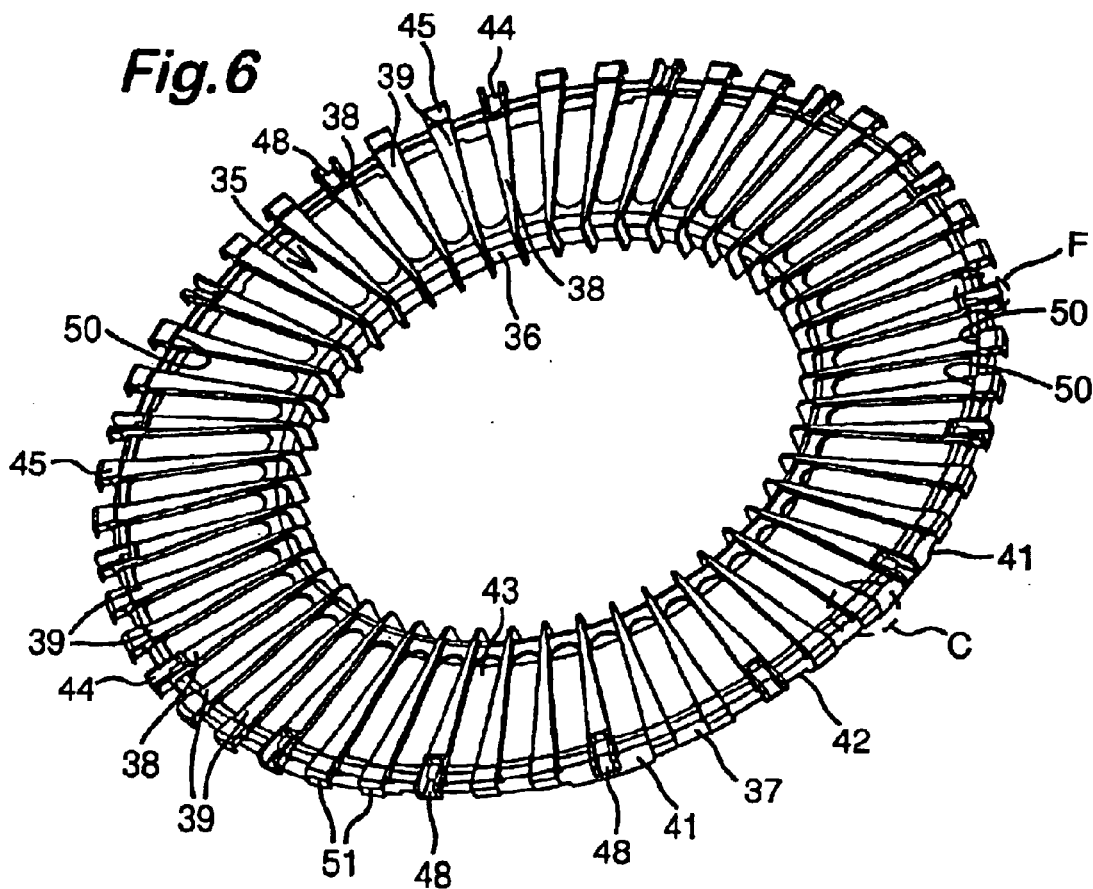
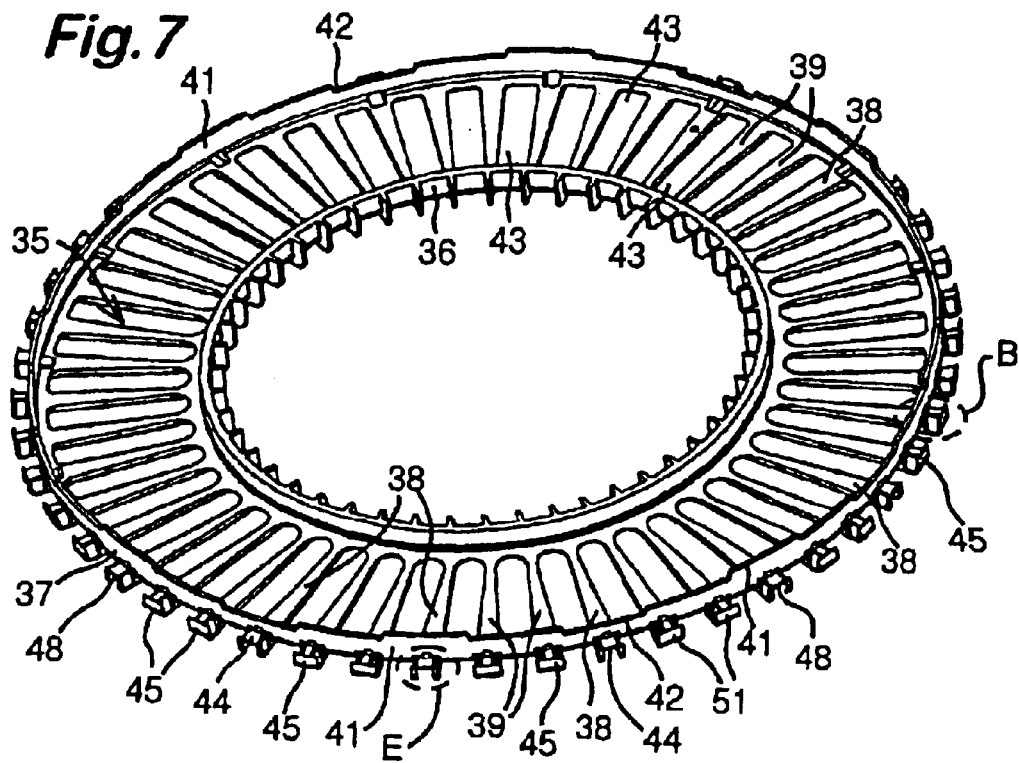

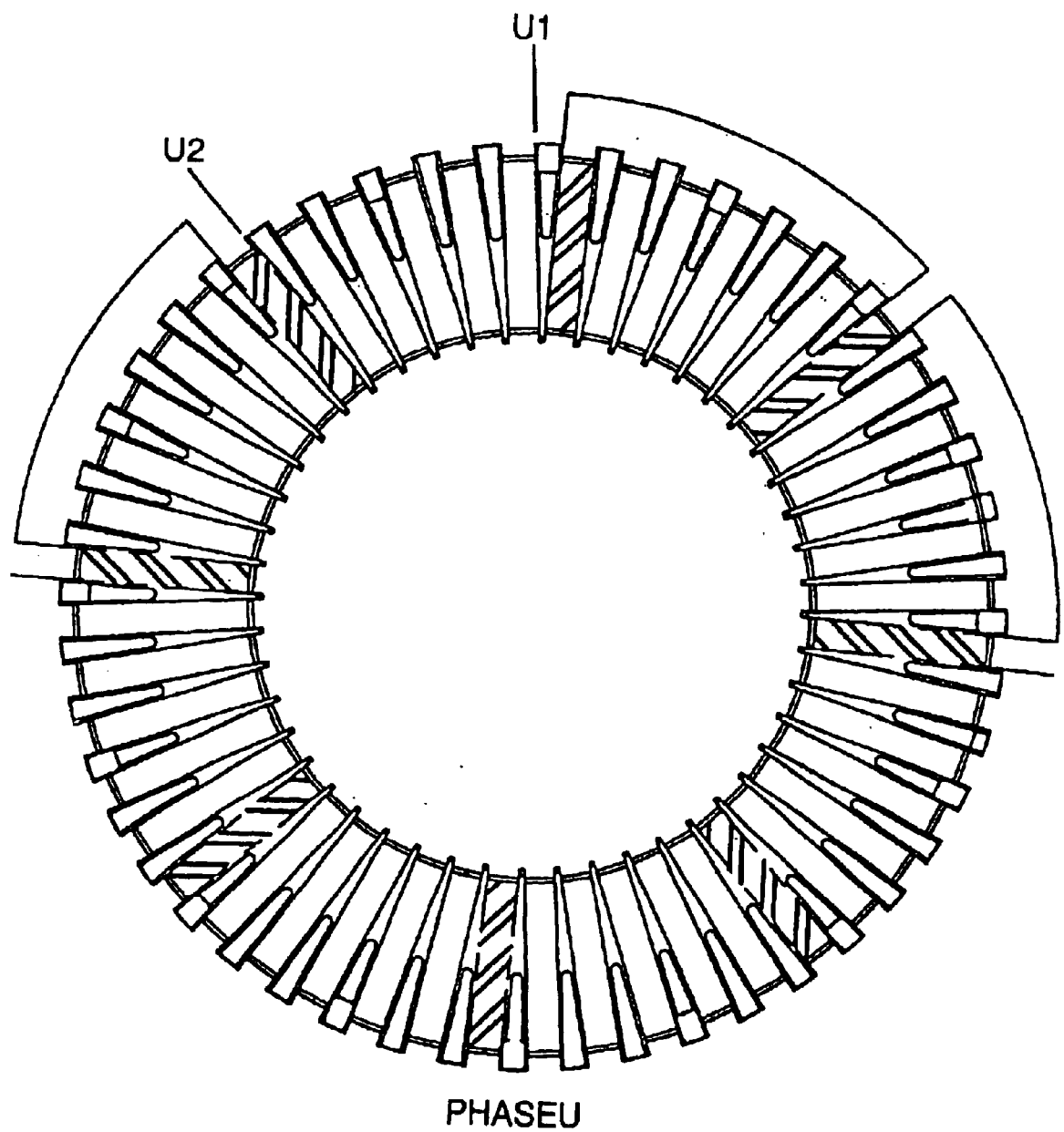

PHASE U

PHASEW

TOROIDAL ELECTRICAL MACHINE AND AN ANNULAR WINDING CARRIER THEREFOR

This invention relates to a toroidal electrical machine including an outer casing, an annular winding carrier which is fixed to the outer casing and a rotor which is rotatable within the outer casing, which is adapted to be coupled with a rotary drive member of a prime mover and which carries a circumferential array of permanent magnets on a radial face which faces a radial face of the annular winding carrier, and to an annular winding carrier for such a toroidal electrical machine.

U.S. Pat. No. 5,334,898 relates to high-density discoidal brushless open frame DC or AC motors and generators in which rare earth permanent magnets are arranged about a disc shaped rotor. A rectangular toroidal stator or annular windings carrier serves as the mounting for numerous flat wound armature coils or phase windings.

JP-A-04364336 discloses an annular stator for a radial flux induction motor wherein a synthetic resin moulded insulator having a profile substantially corresponding to that of the stator core is fitted to the stator core to cover the parts of the core to which a winding is applied.

An object of this invention is to enable the annular winding carrier to be used as a guide for winding phase windings which pass through an air gap formed between the radial faces of the rotor and the annular winding carrier.

According to one aspect of this invention there is provided a toroidal electrical machine including an outer casing, an annular winding carrier which is fixed to the outer casing and which has an annular radial face, a rotor which is rotatable within the outer casing, which is adapted to be coupled with a rotary drive member of a prime mover and which carries a circular array of alternately polarised permanent magnets on a radial face which faces the radial face of the annular winding carrier wherein the annular winding carrier has an annular core of ferromagnetic material which is encased in a hollow annular cover of plastics material, the annular cover being formed of radially inner and outer annular support portions which are joined together across the radial face of the annular core by a circular array of spaced radial ribs which form open ended radial passages, the radially inner and outer annular support portions and the circular array of spaced radial ribs bounding a respective circular array of apertures which are formed in the hollow annular cover over the radial face of the annular core, and electrical phase windings which are wound around the annular core and the annular winding carrier so that they extend radially through the open ended passages around the faces of the inner and outer annular support portions that are remote from the core.

Preferably the annular radial face of the annular winding carrier is one of an axially spaced pair of such annular radial faces, the radial face of the rotor that faces one of the radial faces of the annular winding carrier is one of two such radial faces, the other of the two radial faces of the rotor facing the other of the radial faces of the annular winding carrier so that the annular winding carrier is between the two radial faces of the rotor and the rotor carries two such circular arrays of alternately polarised permanent magnets, each of the circular arrays of alternately polarised magnets being on a respective one of the two radial faces of the rotor, wherein the circular array of spaced ribs which form open ended radial passages and which extend across one of the radial faces of the annular core and join the inner and outer annular support portions together is one of two such circular arrays of spaced ribs, the other circular array of spaced ribs also forming open ended radial passages and extending across the other of the radial faces of the annular core and joining the inner and outer annular support portions together.

According to another aspect of this invention there is provided an annular winding carrier for a toroidal electrical machine, the carrier including a hollow annular cover of plastics material which is to encase an annular core of ferromagnetic material, the annular cover being formed of radially inner and outer annular support portions which are joined together by at least one circular array of spaced radial ribs which extend across a respective opposed radial face of the annular core when that core is encased in the hollow annular cover and which form open ended radial passages for electrical phase windings which are wound around the annular core and the annular winding carrier so that they extend around opposed faces of the inner and outer annular support portions when the annular core is encased in the hollow annular cover and the annular winding carrier is fixed in the toroidal electrical machine, the radially inner and outer annular support portions and the at least one circular array of spaced radial ribs bounding a respective circular array of apertures which are formed in the annular winding carrier.

Preferably each radial rib of the annular winding carrier included in or for the toroidal electrical machine projects radially beyond the radially outer annular support portion, each of the radially projecting rib portions forming a hook around which a winding may be retained temporarily during winding. Conveniently each radially projecting rib portion forms two hooks which are spaced from one another circumferentially. Where the annular winding carrier includes two axially-spaced circular arrays of radial ribs, each of those radial ribs may project radially beyond the radially outer annular support portion and thereby bound an annular path which extends circumferentially around the annular winding carrier.

Conveniently the windings are held within the respective open-ended passages by being embedded within thermoset electrically insulating material.

The radial ribs may be tapered radially inwardly so the open ended radial passages are substantially parallel sided. Conveniently each radial rib projects radially inwards beyond the radially inner ring portion.

Preferably the windings are twisted multi-stranded wire. If the electrical phase windings that were to be wound around the annular winding carrier were to be wound in the form of a multi-stranded cable, the individual conductors or wires of which were arranged so as to run longitudinally in the cable, each conductor would be in a different position in the respective airgap that would be formed between the annular winding carrier and the facing circular array of alternately polarised permanent magnets of the torodial electrical machine in which the annular winding carrier is to be fixed. Some conductors might be in a position in which they are subject to a different level of flux than that to which other conductors are subject. This would result in different currents being induced in different conductors and would lead to electrical imbalance. The twisted nature of the strands of the wire that is wound around the annular winding carrier of a preferred embodiment of the invention, however, results in the position of each strand in the air-gap changing along the section of the multi-stranded wire. Thus, each strand is subject to differing levels of flux along its length. The overall result of this is that, taking an aggregate value over the section of the multi-stranded wire, each strand is subject to a more similar level of flux and therefore has a more similar current induced therein than would otherwise be the case. This reduces electrical imbalance between the strands of the multi-stranded wire.

Conveniently the twisted multi-stranded wire is covered with insulant impregnated sheet wrapping material such as paper whilst it is being wound on the annular winding carrier. The strands of the multi-stranded wire may be impregnated with electrically insulating material. Where the electrically insulating material with which the sheet wrapping material is impregnated and the multi-stranded wire is impregnated is a curable resin, the windings are preferably wound on the annular cover with the resin in its uncured form, the resin being cured and hardened after the windings have been wound onto the annular winding carrier whereby to imbue the windings with strength and to enable the windings to hold the annular stator assembly together.

Preferably the windings are wound on the annular winding carrier in a single layer of juxtaposed turns. The windings may be arranged to provide a plurality of multiphase outputs, for example, a dual three-phase output. The windings of each phase may be wound on the annular winding carrier in groups of juxtaposed turns, each group being spaced circumferentially from the juxtaposed group of that phase by a group of juxtaposed turns of the or each other phase. Conveniently there are the same number of turns in each group of turns of each winding of each phase. The spaced groups of juxtaposed turns of multiple multiphase windings may be arranged so that pairs of leads at the ends of all the windings are adjacent one to another.

In a preferred embodiment of this invention, the hollow annular cover is an interlocked pair of similar annular mouldings of plastics material which are joined together along joint lines which extend circumferentially around the radially inner and outer annular support portions. The circular edge of each of the annular mouldings that forms the joint line that extends circumferentially around the radially outer annular support portion conveniently forms alternate generally rectangular tabs and recesses, each tab being an interference fit in a respective one of the recesses that is formed by the other annular moulding whereby the two annular mouldings are interlocked against relative circumferential movement. The annular core may be an interference fit in each of the parts of the radially outer annular support portion that are formed by the annular mouldings. Conveniently the opposed ends of each of the tabs and of each of the recesses converge radially outwards so that the tabs are urged into the recesses with a wedge action due to the interference fit of the annular core in the outer annular parts of the annular mouldings.

In a preferred embodiment, the multi-stranded wire has twelve strands and there are eight groups of four turns in the windings of each of the six phases of dual three-phase windings.

A three-phase AC generator in which this invention is embodied and a modification thereof is described now by way of example with reference to the accompanying drawings, of which:

FIG. 6 is a perspective view from the outside of an annular moulding which is half a cover of the stator assembly shown in FIGS. 3, 4 and 5;

FIG. 7 is a perspective view of the interior of the annular moulding shown in FIG. 6;

Figure 17:
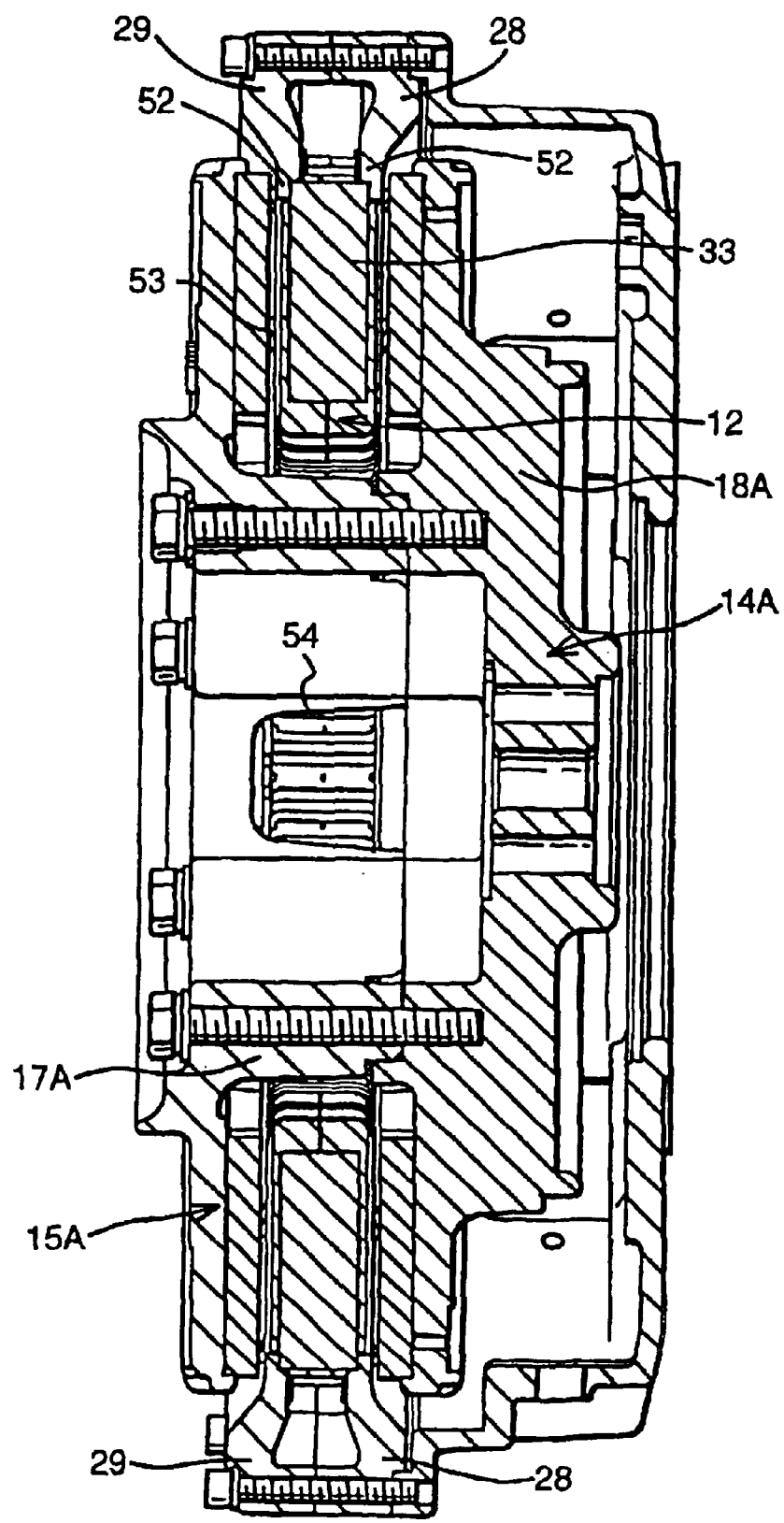

FIGS. 16A to 16G illustrate winding a dual three phase winding on the stator assembly of the AC generator illustrated in FIGS. 1 to 15; and FIG. 17 is a transverse cross section of a modified form of the AC generator shown in FIGS. 1 to 15, the section being on a diameter through an opposed pair of the tongues that project radially inwards from the retainer rings, the dished cover being omitted for convenience.

FIGS. 1 to 4 show an AC generator which has a rotor 10 which is rotatable in a casing 11 relative to a stator assembly 12 which is mounted in the casing 11. The rotor 10 is adapted to be mounted on the drive shaft of a diesel engine in place of the usual flywheel. The rotor 10 is fixed to the drive shaft in the same way as the flywheel would be. The casing 11 is provided with fixing blots 13 by which it is fixed to the engine block of the diesel engine.

The rotor 10 comprises a co-axial pair of rotor discs 14 and 15. Each rotor disc 14, 15 has a hub portion 16, 17 and an annular disc portion 18, 19 which projects radially outwardly from the respective hub portion 16, 17. The hub portion 16 of the rotor disc 14 is the part of the rotor 10 that is adapted to be coupled with the diesel engine drive shaft. The hub portion 17 of the other rotor disc 15 is annular and is spiggotted into a correspondingly shaped recess 21 which is formed in the hub portion 16 on the side of the rotor disc 14 opposite to the side thereof that is to be mated with the diesel engine drive shaft. The two rotor discs 14 and 15 are fastened together by setscrews 22 which extend through the annular hub portion 17 of the rotor disc 15 and which are screwed into the hub portion 16 of the rotor disc 14.

Each rotor disc 14, 15 has a circular array of alternately polarised permanent magnets 23, 24 fixed to and positioned on the radial face 25, 26 of the respective annular disc portion 18, 19 that faces the other annular disc portion 18, 19. Each rotor disc 14, 15 with the respective magnets 23, 24 mounted thereon which conveniently is as described and illustrated in our co-pending International patent application No. PCT/GB02/00092 filed 10 Jan. 2002 (International Publication WO 02/056443) and which designates the priority of British patent application No. 0100635.2 filed 10 Jan. 2001.

Figure 1:
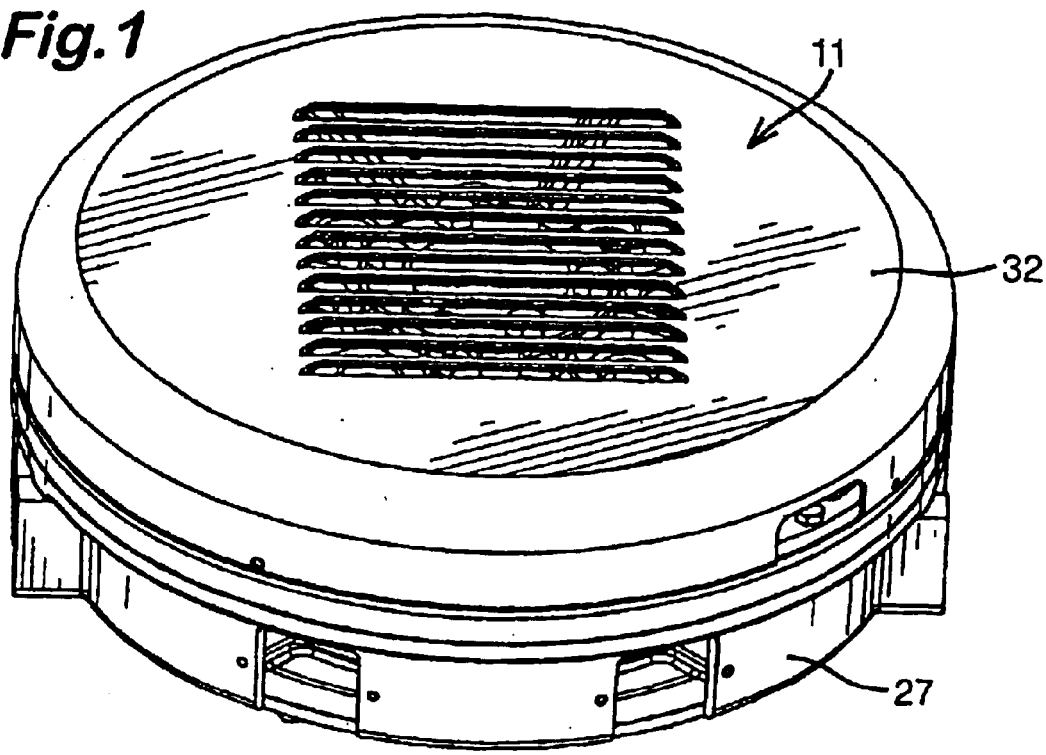
FIG. 1 is a view in perspective of the AC generator as seen from one side.
Figure 2:
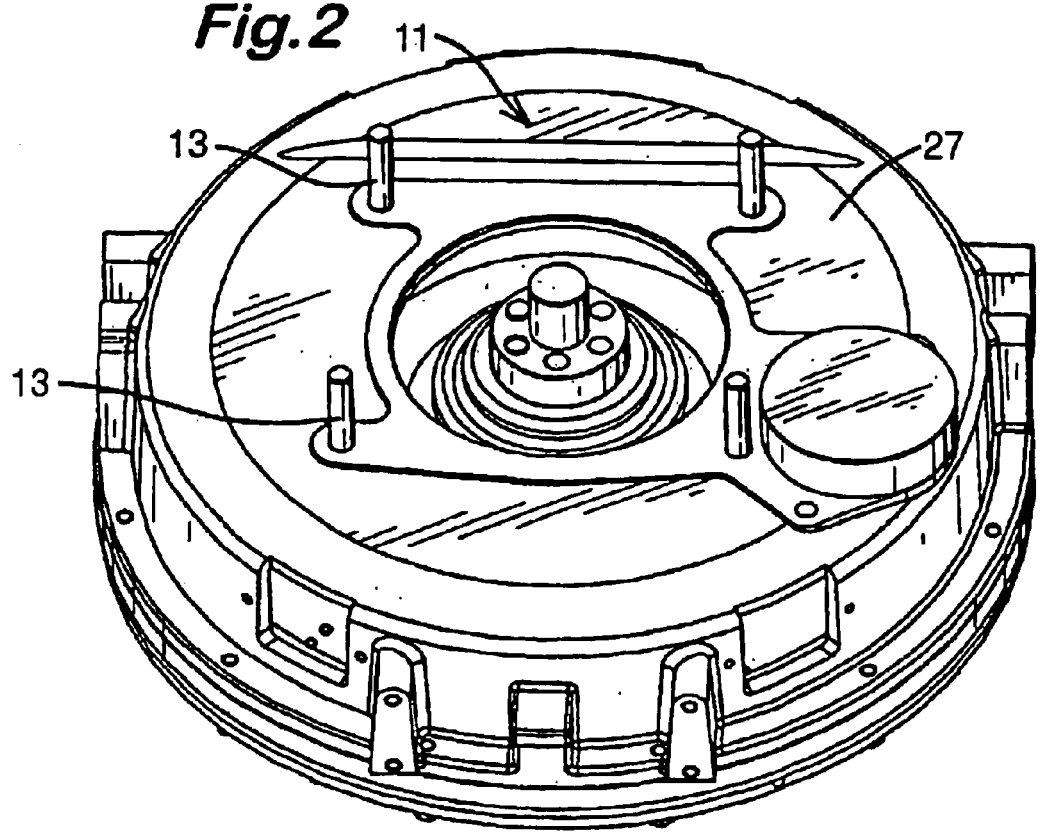
FIG. 2 is a view in perspective of the generator shown in FIG. 1 as seen from an opposite side and showing fixing bolts and a rotary shaft which is for coupling with a drive shaft of a prime mover such as a diesel engine, the fixing bolts being for mounting a casing of the generator on static structure of the prime mover.
Figure 3:
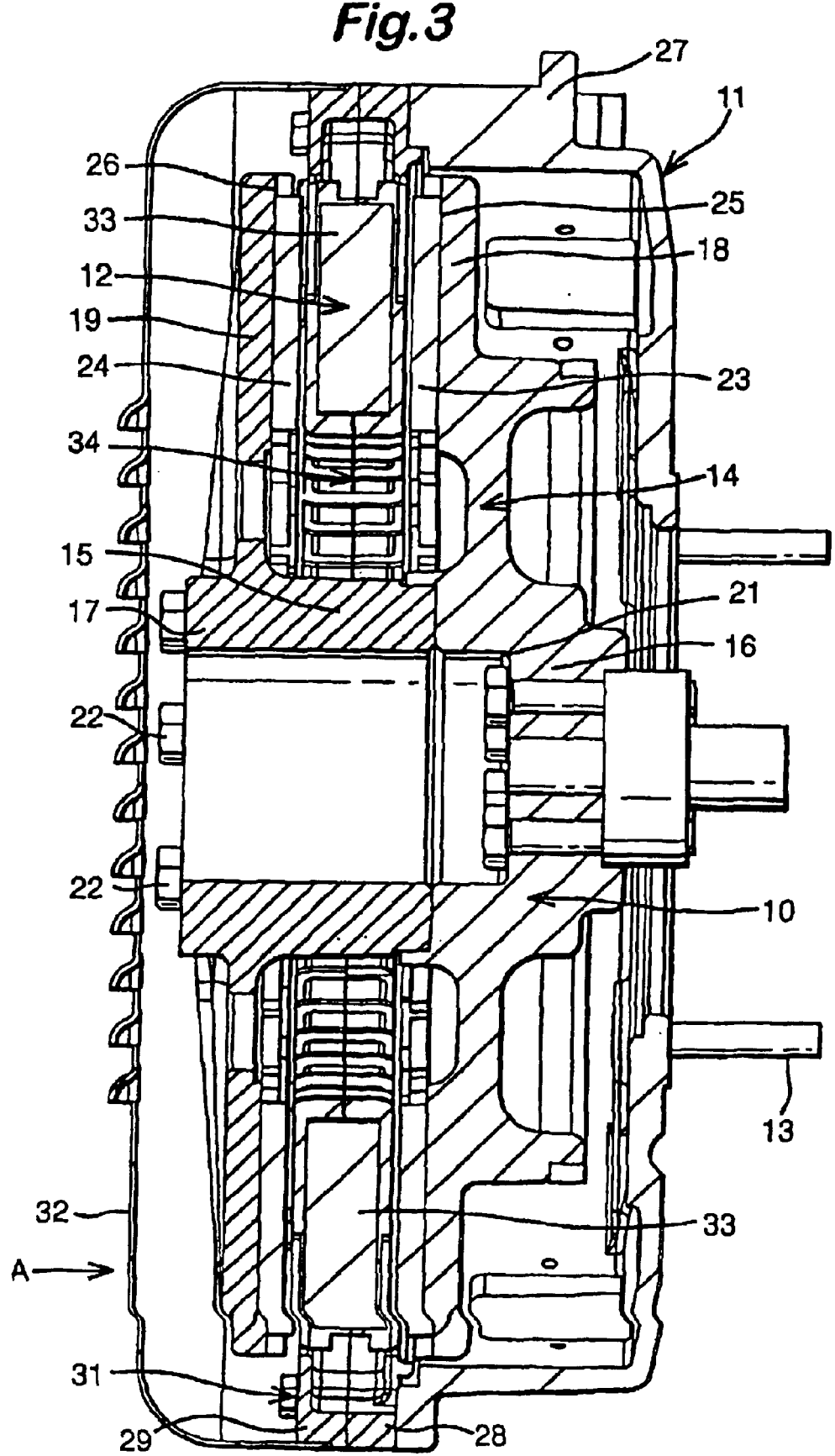
FIG. 3 is a transverse cross-section of the generator shown in FIGS. 1 and 2.
Figure 4:
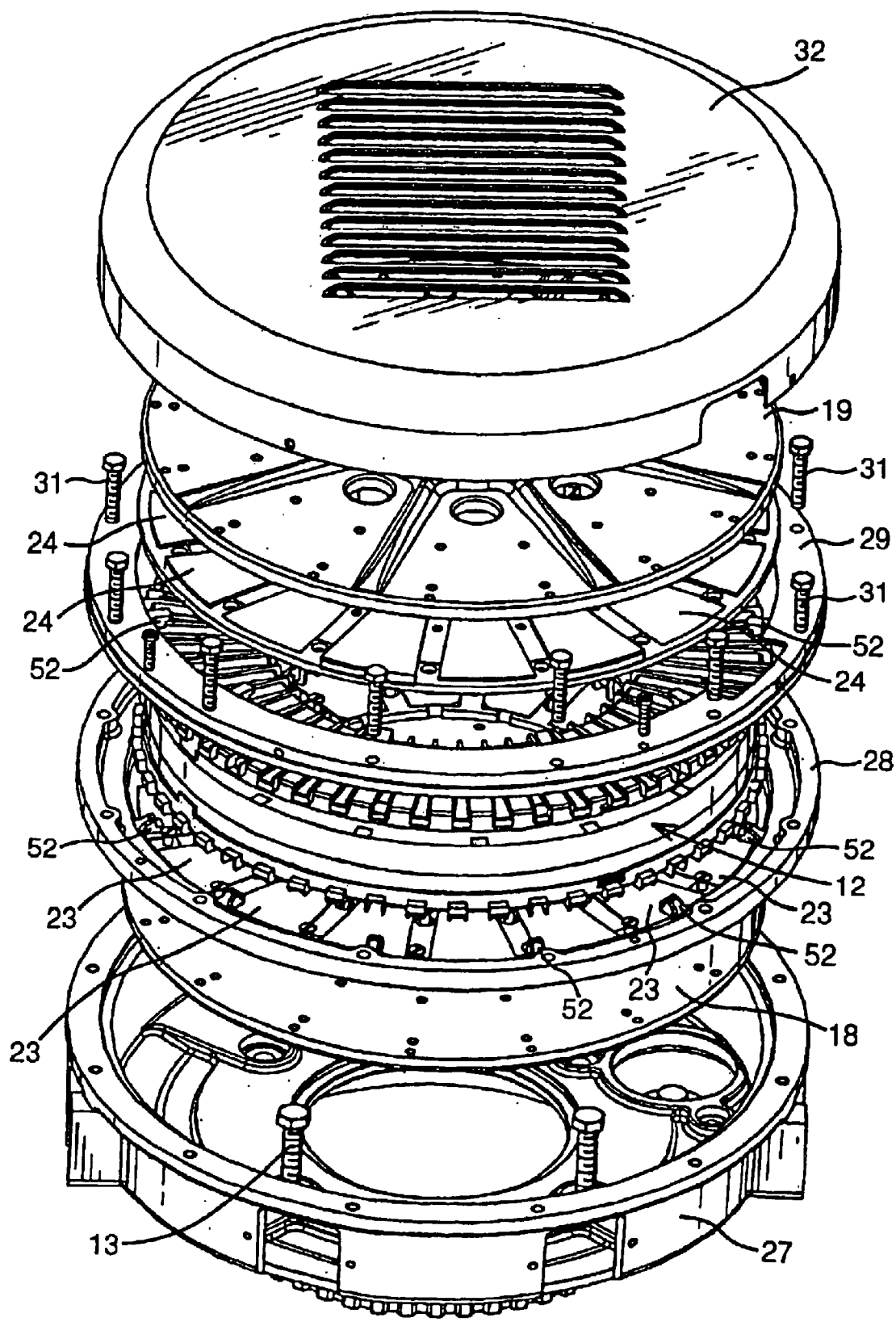
FIG. 4 is an exploded view in perspective of the components shown in FIGS. 1 and 2.
Figure 5:
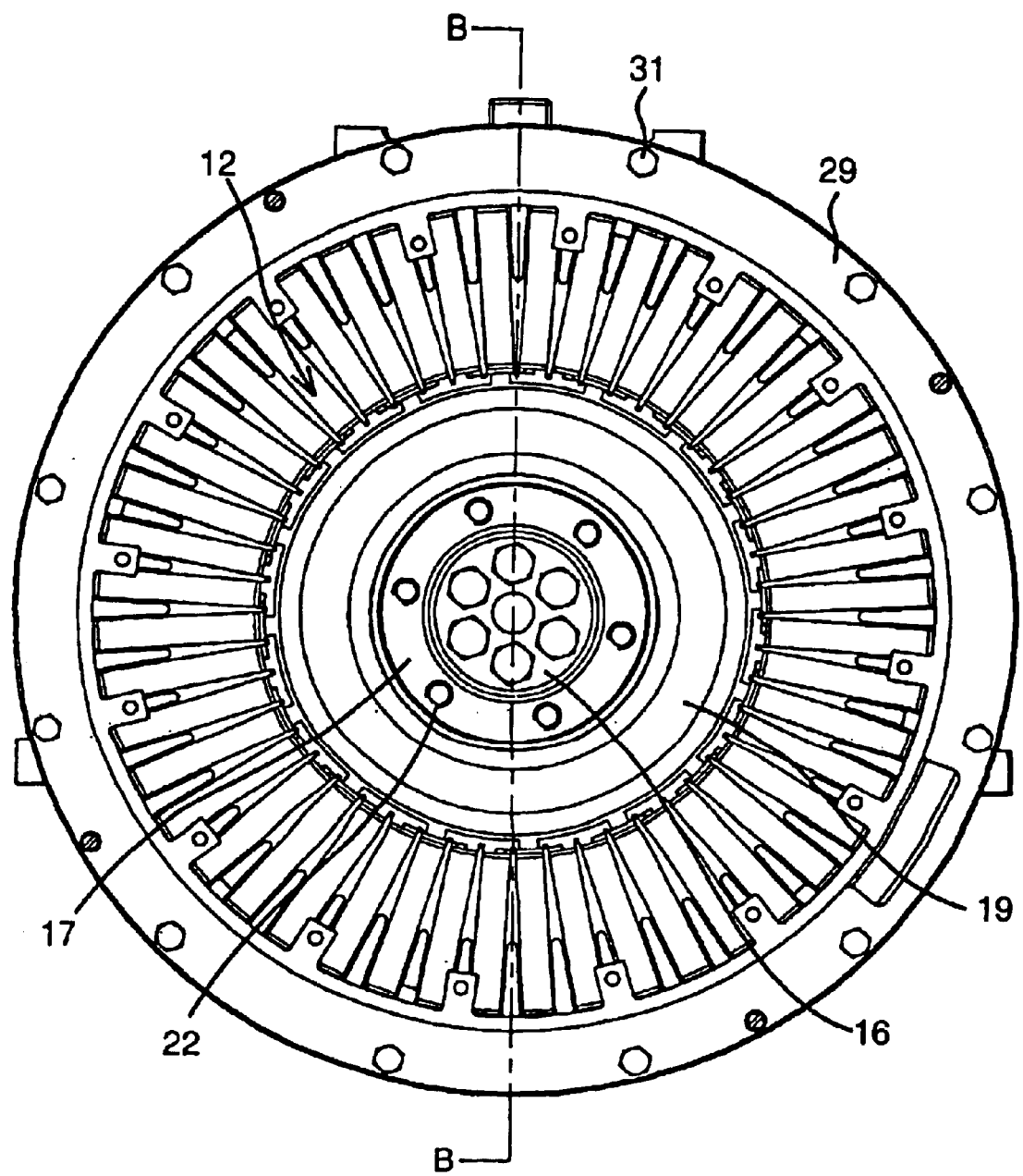
FIG. 5 is an end elevation, as seen in the direction of arrow A in FIG. 3, of the generator with its cover and an outer magnet carrier plate part of the generator rotor removed to reveal the stator of the generator and one of its mounting rings.
Figure 8:
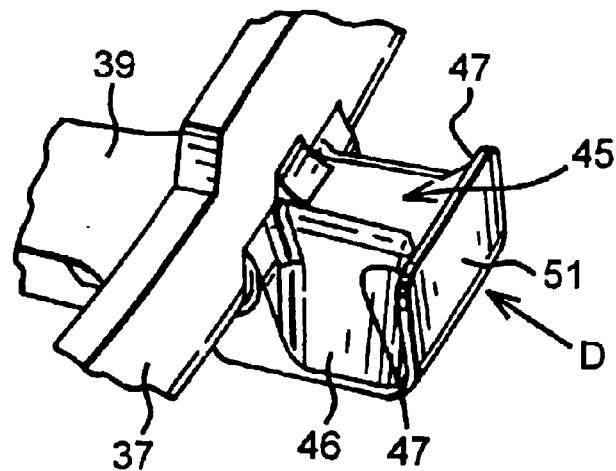
FIG. 8 is a detail B of FIG. 7 to a larger scale.
Figure 9:
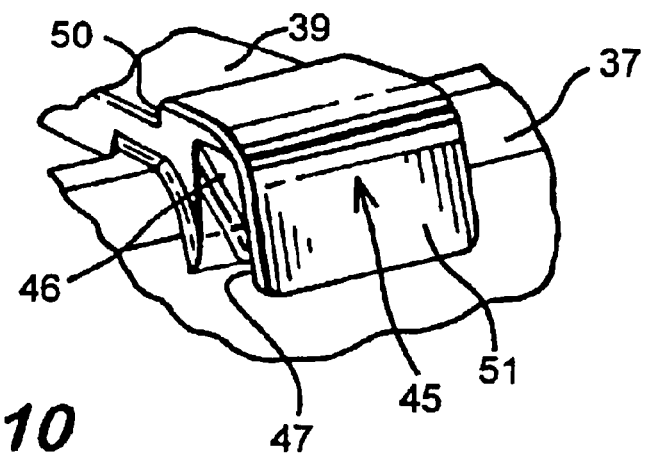
FIG. 9 is a detail C of FIG. 6 to a larger scale which is also a view on arrow D of the fragment shown in FIG. 8.
Figure 10:
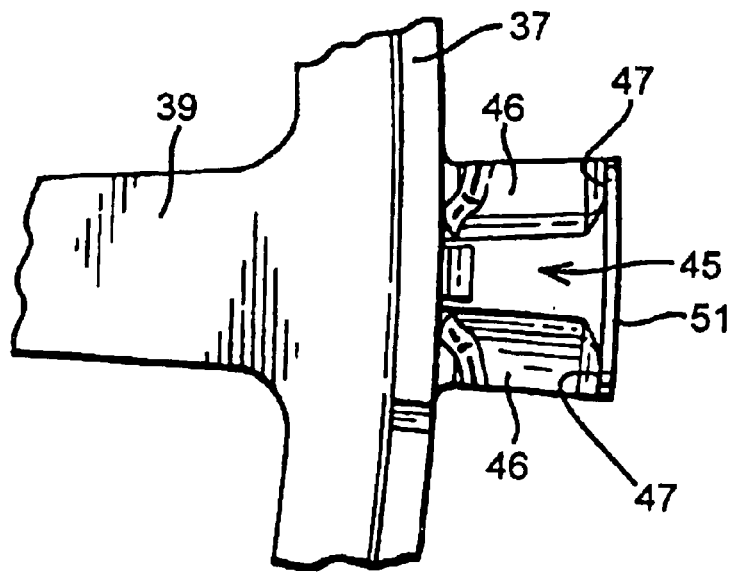
FIG. 10 is a plan view of the fragment shown in FIG. 8.
Figure 11:
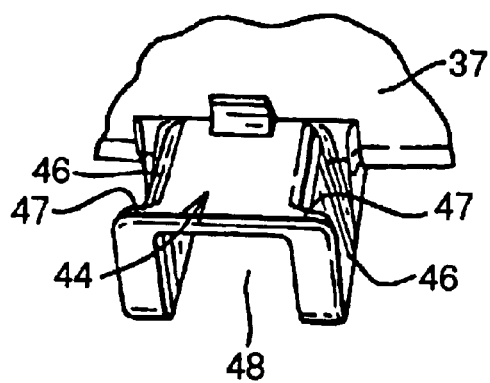
FIG. 11 is a detail E of FIG. 7 to a larger scale.
Figure 12:
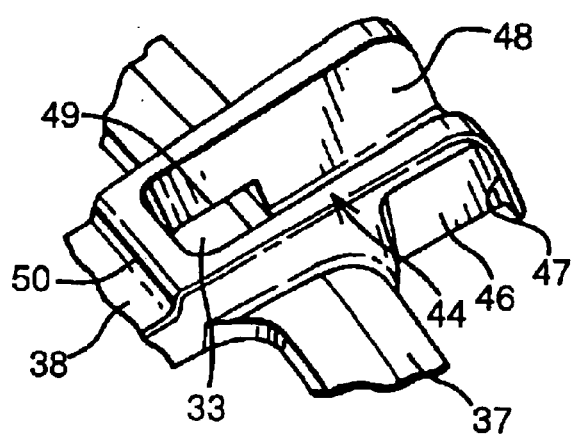
FIG. 12 is a detail F of FIG. 6 to a larger scale.
Figure 13:
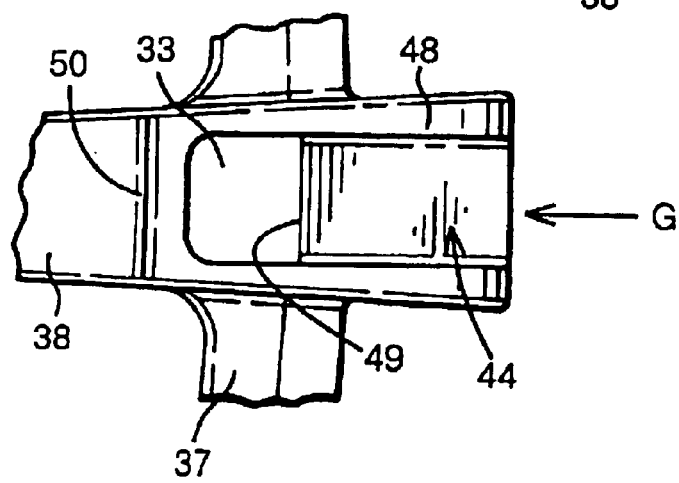
FIG. 13 is a plan view of the fragment shown in FIG. 12.
Figure 14:
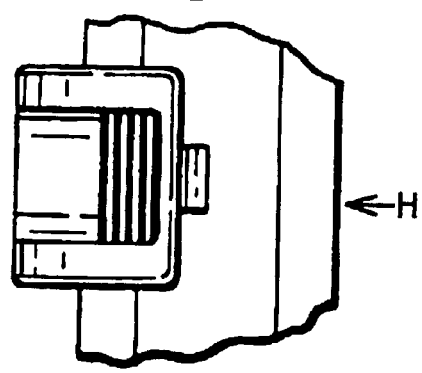
FIG. 14 is an elevation on arrow G of FIG. 13.
Figure 15:
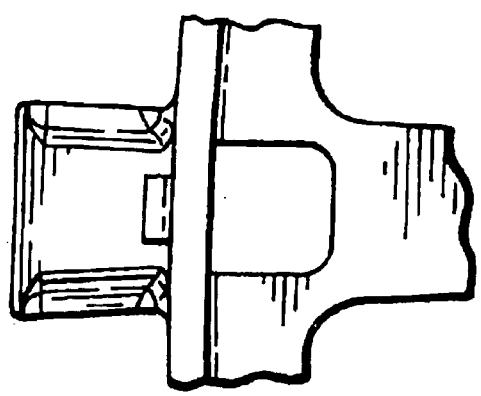
FIG. 15 is an elevation on arrow H of FIG. 14.
Figure 16A:
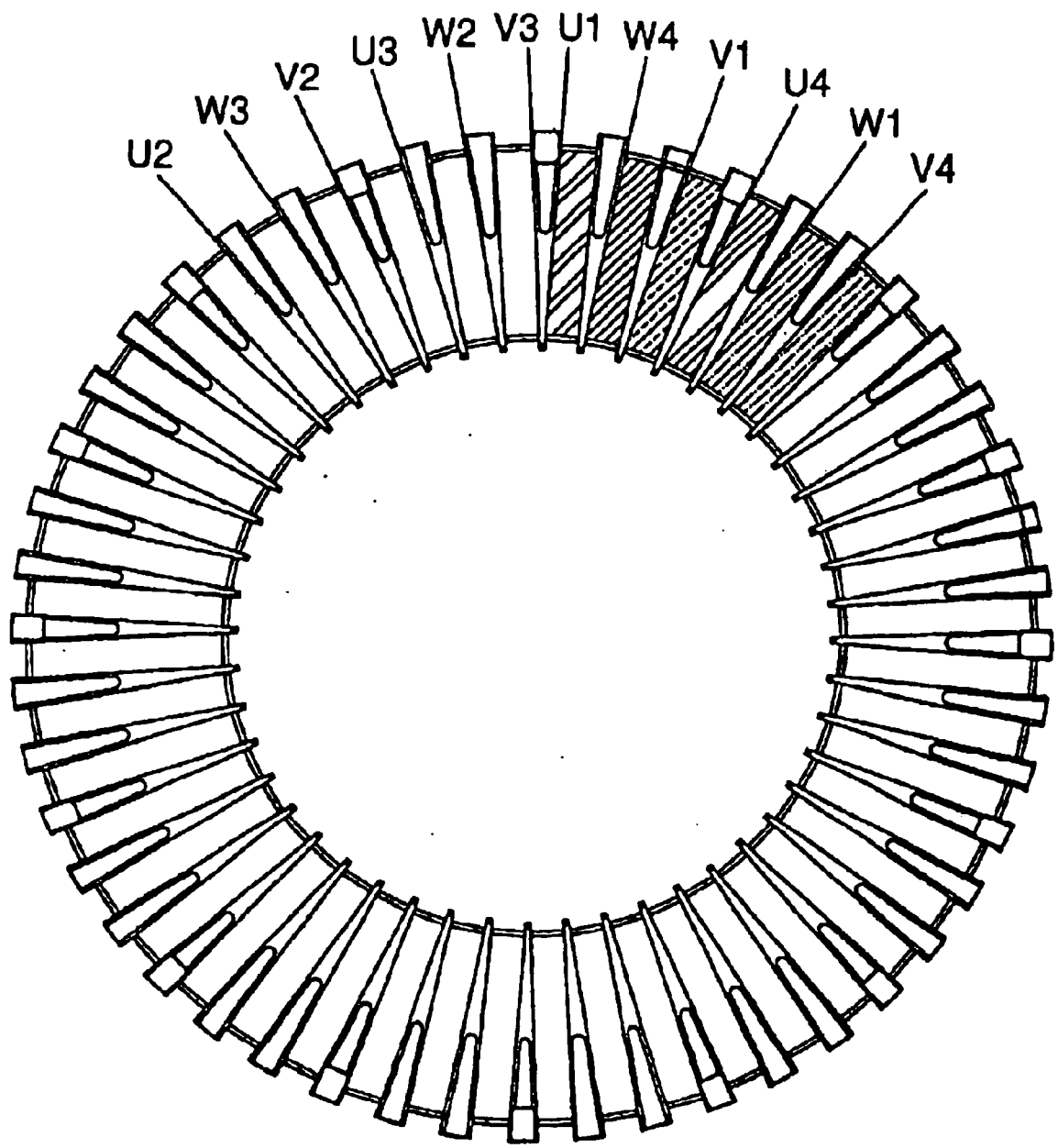
Figure 16C:
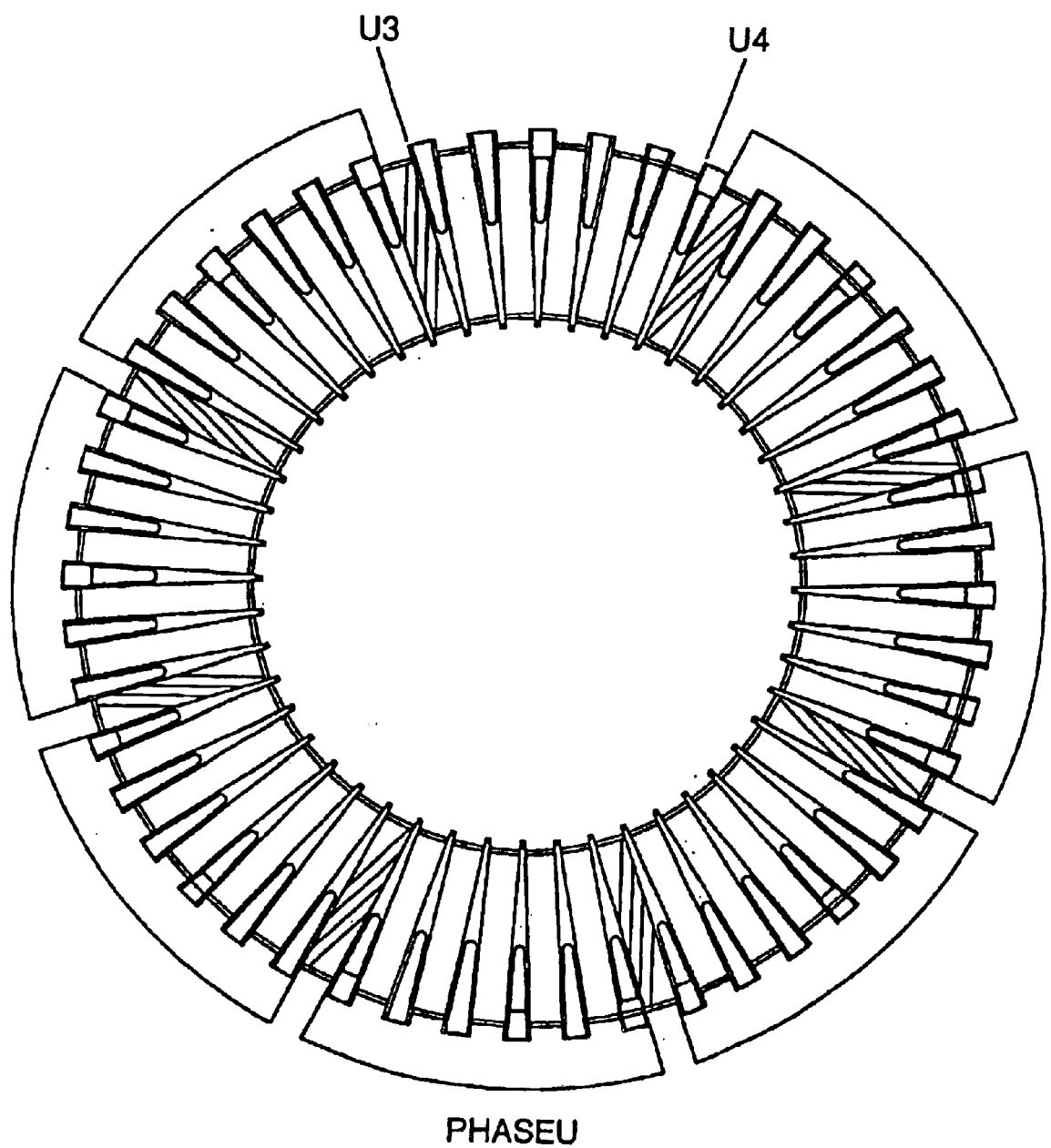
Figure 16D:
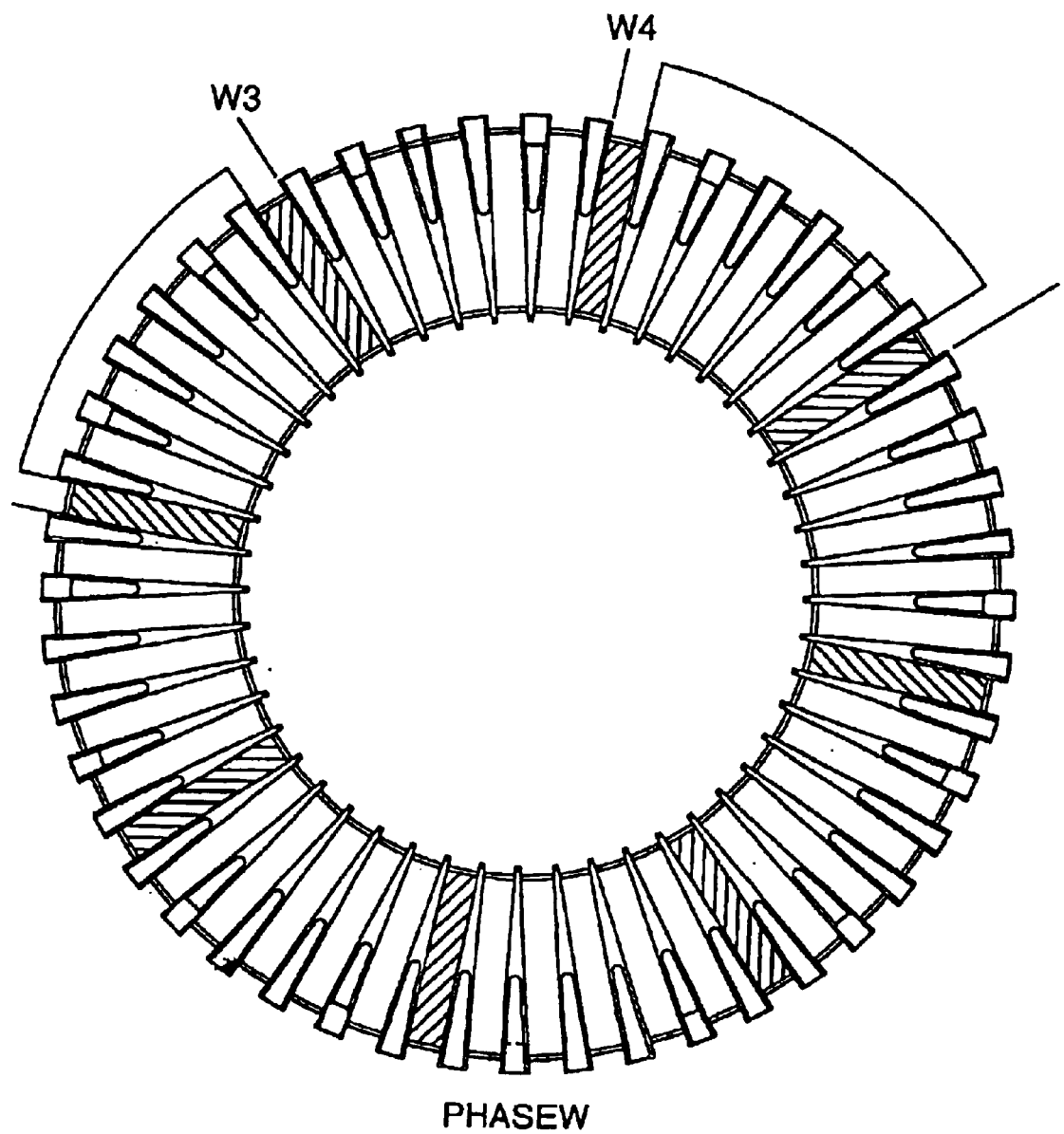
Figure 16E:
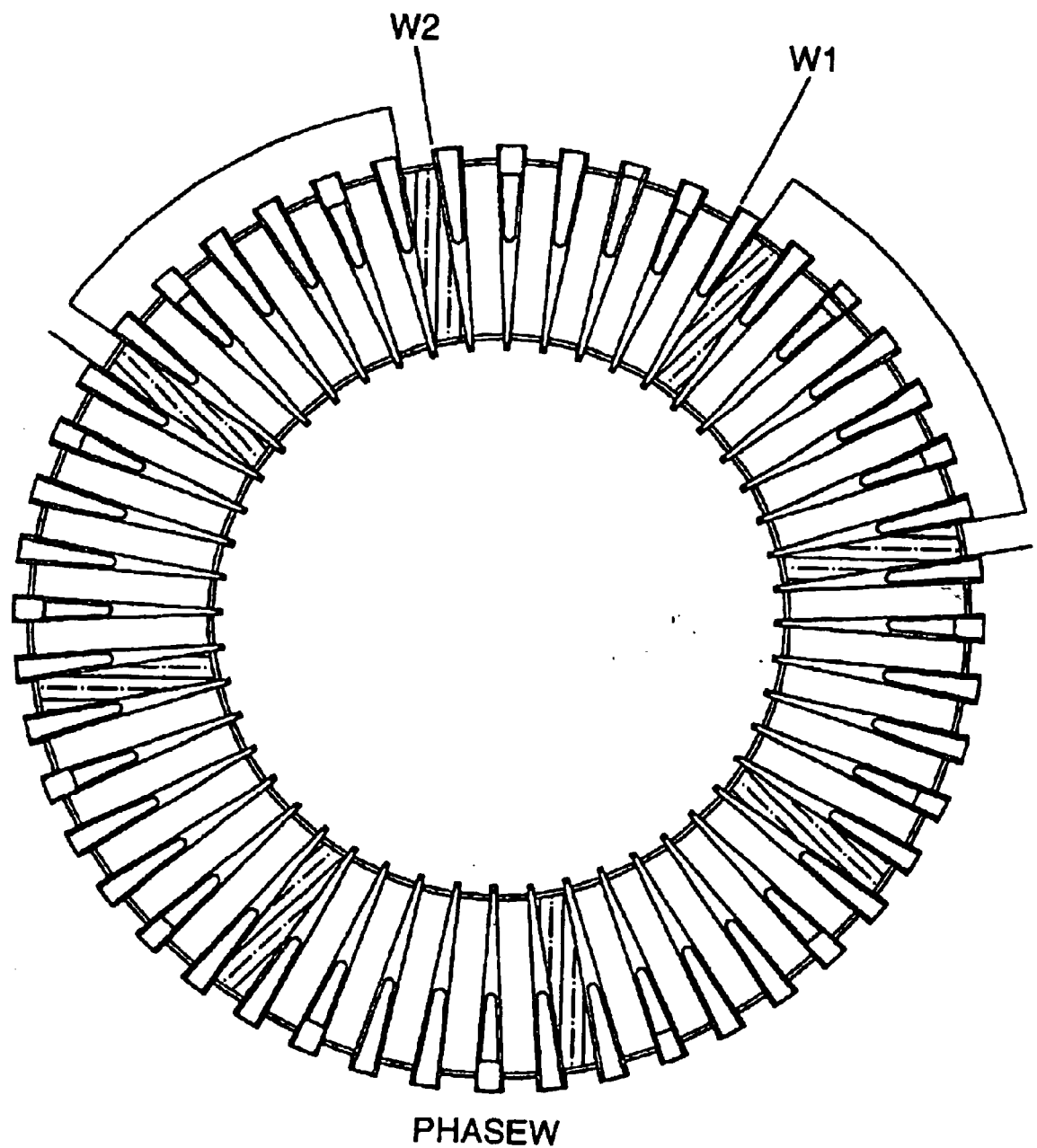
Figure 16F:
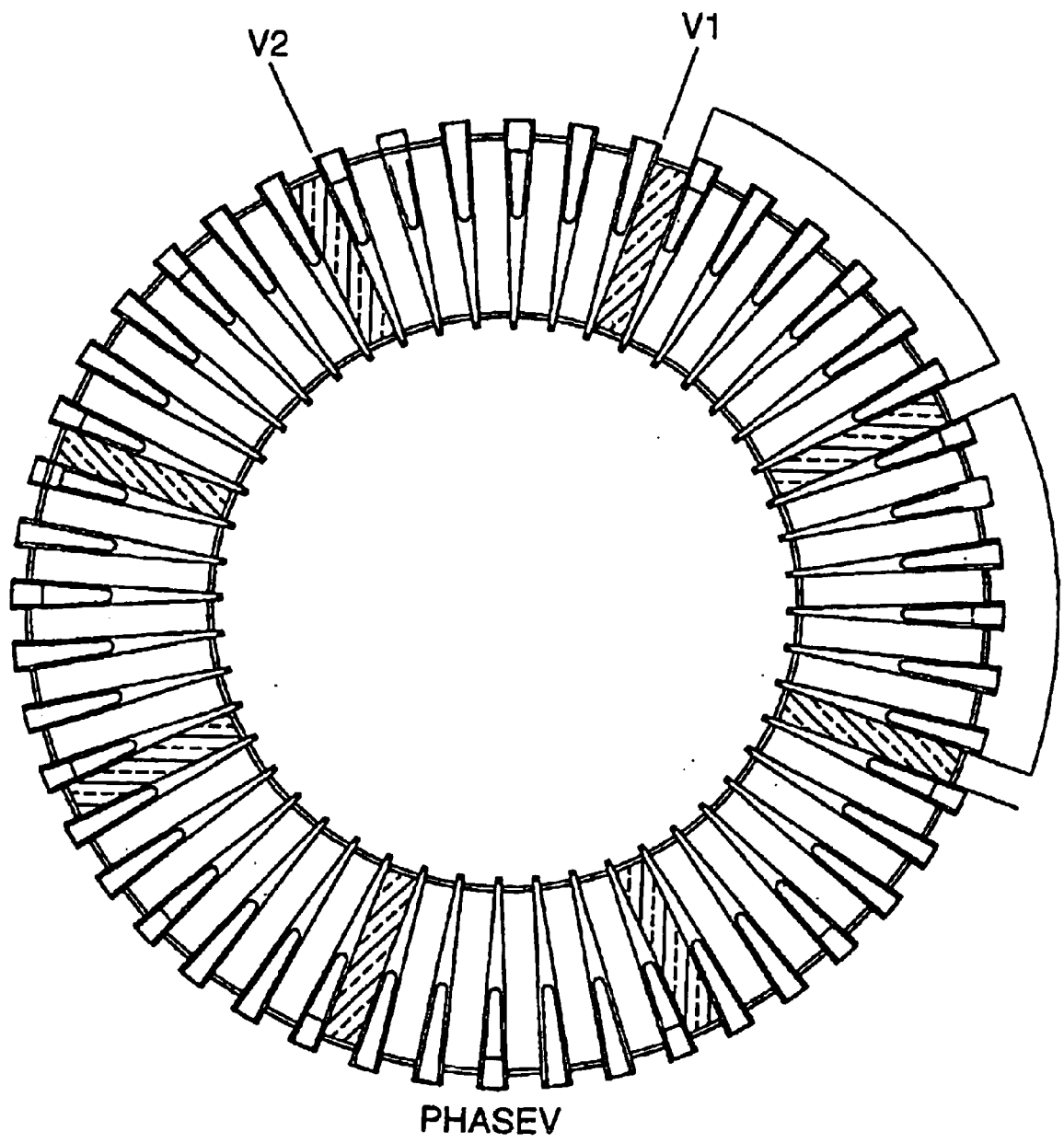
Figure 16G:
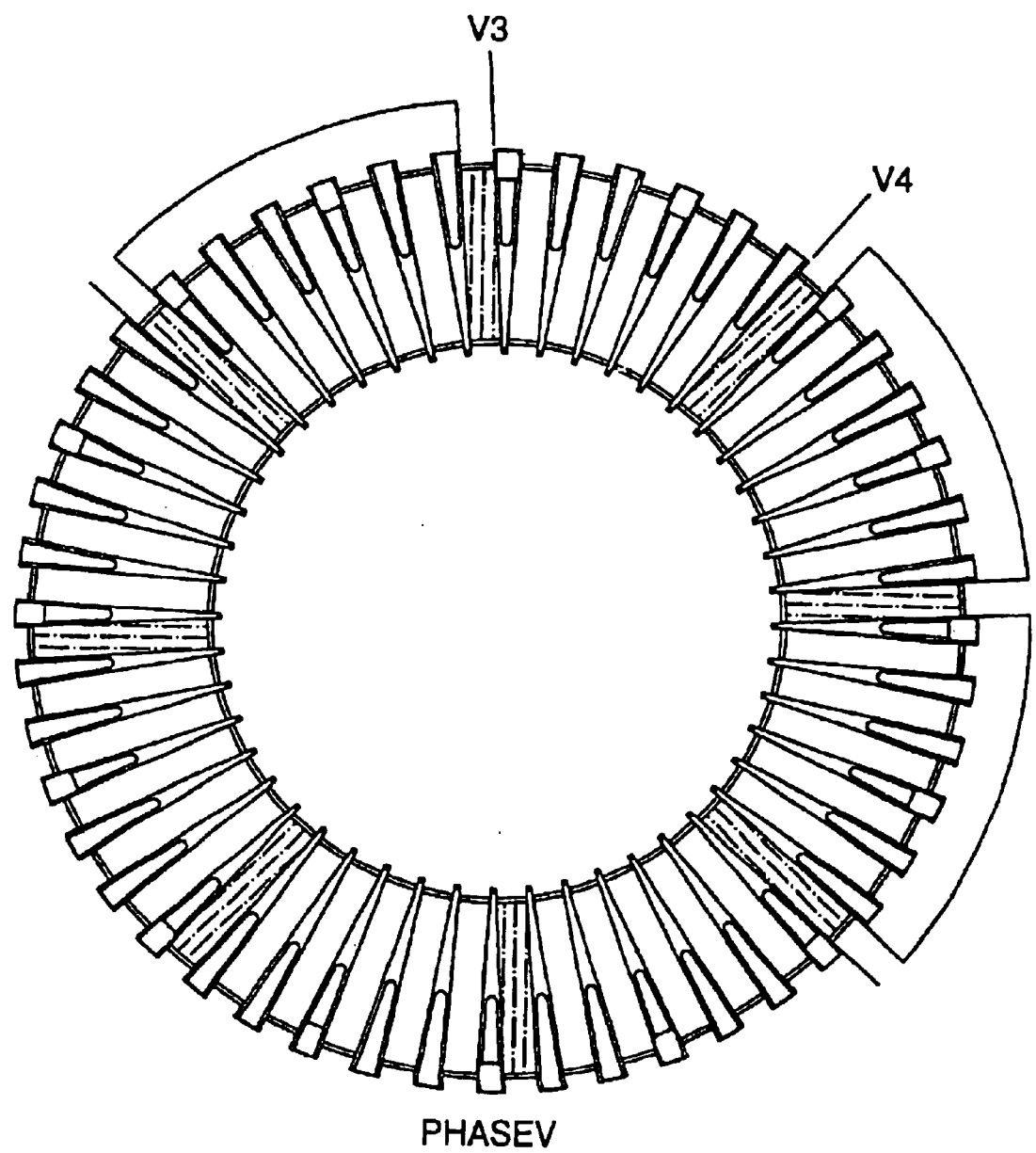

The casing 11 comprises a shallow cup-shaped annular component 27. The fixing bolts 13 are mounted in the base of the annular component 27 at circumferentially spaced locations therein. The stator assembly 12 is annular. FIG. 3 shows that a pair of retainer rings 28 and 29 embrace the radially outer peripheral portion of the stator assembly 12 and are fixed to the brim of the cup-shaped component 27 by a circular array of setscrews 31 which pass through the retainer rings 28 and 29 so that the stator assembly 12 is supported by the cup-shaped component 27 between the opposed circular arrays of permanent magnets 23 and 24 that are carried by the rotor 10 and from which it is spaced. The remainder of the casing 11 is a dished cover 32 which is fitted over the retainer ring 29 that is spaced from the brim of the annular component 27 so as to enclose the rotor 10 and the stator assembly 12. Ventilation louvres are formed in the cover 32 and ventilation holes are formed in the side wall of the annular component 27.

The stator assembly 12 comprises an annular core 33 of ferromagnetic material, a two-part moulding 34 of an electrically insulating plastics material which encases the annular core 33, and stator windings (not shown) which are wound around and carried by the two part moulding 34. It follows that the two part moulding is an annular winding carrier. The two annular parts 35 of the two part moulding 34 are substantially similar.

The annular core 33 is formed by rolling a continuous strip of ferromagnetic material lined with a thin sheet of a loaded epoxy resin electrically insulating material such as Nomex, on itself into a tightly wound flat spiral laminated structure. The laminations extend parallel to the axis of the annular core 33. Each side of the annular core 33 is lined with a sheet of loaded epoxy resin electrically insulating material such as Nomex which is bonded to the core 33.

The stator windings are dual three phase windings arranged so that rotation of the rotor 19 relative to the stator assembly 12 generates two three phase AC outputs. The AC outputs are fed to a control system which conveniently is as described with reference to FIG. 7 of the drawings of our International application GB01/00169 filed 16 Jan. 2001 (International Publication WO 01/56133). The control system is operable to control the speed of the engine on which the rotor 10 is mounted when in use such that the speed at which the AC generator is driven is varied automatically so as to vary the AC outputs to match variations in an external load.

FIGS. 6 and 7 respectively show opposite sides of one of the annular parts 35 of the two-part moulding 34 or annular winding carrier. The moulded annular component which comprises an annular part 35 comprises co-axial inner and outer ring portions 36 and 37 joined together by a circular array of spaced radial ribs 38 and 39. The ring portions 36 and 37 project in the same direction from the array of radial ribs 38 and 39, that direction being substantially parallel to the axis of the annular part 35. The circular edge of the radially inner ring portion 36 that is remote from the radial ribs 38 and 39 is flat, lying in a notional plane which is normal to the axis of the annular part 35. The corresponding circular edge of the radially outer ring portion 37 is stepped at circumferentially spaced locations around it to form alternate generally rectangular tabs 41 and generally rectangular recesses 42, there being eight tabs 41 and eight recesses 42 and each tab 41 being spaced from the juxtaposed recesses 42. The circumferentially spaced ends of each tab 41 and of each recess 42 slope at a small angle to a notional line which is parallel to the axis of the annular part 35, the angle of the slope at either end of each tab 41 preferably being slightly less than the angle of the slope at each end of each recess 42. Further the opposed ends of each tab 41 and of each recess 42 converge radially outwardly, the angle included between the opposed ends of each tab 41 being substantially the same as the angle included between the opposed ends of each recess 42.

The radially inner surface of the radially outer ring portion 37 of each annular part 35 is stepped, that portion of the inner surface that is nearer to the circular array of radial ribs 38 and 39 having a smaller diameter than does the remainder.

The two annular parts 35 are placed one on either side of the annular core 33 with the ring portions 36 and 37 of each annular part 35 extending towards those of the other annular part 35 and with their edges in contact so that the two part moulding 34 is a hollow annular body. The annular core 33 is an interference fit in the smaller diameter portion of the radially inner surface of the radially outer ring portion 37 of each of the annular components 35. This and the trapezoidal cross-section of the tabs 41 and recesses 42 causes each tab 41 to be urged radially outwardly with a wedge action into the respective radially aligned recess 42 formed by the other annular part 35. Each tab 41 preferably is a press fit in the corresponding one of the recesses 42. Hence the two annular parts 35 are interlocked against circumferential movement one relative to the other. The loaded epoxy resin electrically insulating material that lines and is bonded to each side face of the annular core 33 is also bonded to the inner surfaces of the ribs 38 and 39 whereby the annular core 33 is fixed to the annular winding carrier that is the two part moulding 34.

A circumferential array of elongated apertures 43 is formed in the two part moulding 34 on either side of the stator core 33 between the radially inner and outer ring portions 36 and 37 and adjacent ones of the radially extending ribs 38, 39.

Each rib 38, 39 tapers radially inwardly and projects radially beyond each of the inner and outer rings 36, 37. The inner end of each rib 38, 39 is thin and generally rectangular, extending to the circular edge of the radially inner ring portion 36. The radially outer projecting portion 44, 45 of each rib 38, 39 is formed as a hook by having a chamfer 46, formed on either side. Furthermore each radially outer projecting portion 44, 45 is thicker than the portion of the respective rib 38,39 that extends between the inner and outer portions 36 and 37 in a direction parallel to the axis of rotation of the rotor 10 so that a step 50 is formed in the radial surface that faces the adjacent circular array of magnets 23, 24, that step 50 being located substantially at the root of each radially outer projecting portion 44, 45.

Each chamfer 46 extends radially from the radially outer face of the radially outer ring portion 37 to a shoulder 47 which is formed at a short distance from the radially outer end of the respective rib 38, 39. Due to the chamfer 46 the radially outer projecting portion 44, 45 of each rib 38, 39 tapers in an axial direction towards the other annular part 35 on the other side of the annular stator core 33.

Every third rib 38 differs from the pair of ribs 39 therebetween. Each rib 38 has a recess 48 formed in it between its two chamfered sides. Hence the radially outer end of each rib 38 is U shaped, the sides of the U being generally perpendicular to the base of the U so that the edges formed by the sides of the U are spaced apart to a greater extent than are the adjacent chamfered surfaces 46 on each side of the respective radially outer projecting portion 44. The recess 48 communicates with an opening 49 which is formed in the radially outer ring portion 37, that opening 49 extending into the radially outer projecting portion 44 at right angles to the part of the opening 49 that is formed in the radially outer ring portion 37. The opening 49 exposes the underlying portion of the annular stator core 33. In contrast, the radially outer projecting portion 45 of each rib 39 is solid having a rectangular end portion 51 which is wider than the adjacent chamfered portions 46 between it and the radially outer ring portion 37. The chamfered surfaces 46 and the wider end portion 51 of the radially outer projecting portions 45 form the hooks as do the corresponding parts of the radially outer projecting portion 44 of each recessed rib 38.

Each recessed rib 38 is adapted to receive a respective one of sixteen equally spaced radially inwardly projecting tongues 52 which are formed on the respective one of the retainer rings 28, 29. Each tongue 52 abuts the exposed portion of the annular core 33. In that way, the retainer rings 28 and 29 that are fastened to the rim of the cup-shaped annular component 27 react directly against the annular core 33. Being so located with respect to both the annular core 33 and the cup-shaped component 27, the retainer rings 28 and 29 together with the annular winding carrier 34 thereby provide protection for the windings that are carried by the annular winding carrier 34.

The two annular arrays of radially outer projecting portions 44 and 45 of the two annular parts 35 are spaced from one another axially so that they bound a circular path through which wires may be lead.

The dual 3-phase stator windings are arranged in a single layer of turns of a multi-stranded wire. The multi-stranded wire comprises twelve strands of thin copper wire twisted together like a rope, each strand having been pre-coated with a layer of an electrically insulating polymeric material. Also the multi-stranded wire is infiltrated with an electrically insulating resin, such as an epoxy resin, in powder form. The particles of resin, which are disposed on the outer surface of each of the strands of copper wire, are heatable so as to melt and subsequently to cure and harden. The resultant bundle of twelve wires is held together by a tape of resin impregnated paper which has been spirally wound around the bundle along its length. The helically wound tape serves to preserve the twisted arrangement of the copper wires and provides further electrical insulation, the resin impregnated paper being an electrical insulator The resultant paper covered stranded wire is stiff.

The stiff paper covered multi-stranded wire is wound by a robot machine onto the annular winding carrier 34. The robot machine includes a C-shaped cassette in which the stiff wire is stored. The cassette is caused by operation of the robot machine to travel along an orbital path and is operable to dispense the wire as it travels. The stator assembly 12 is held stationary at a winding station in the robot machine whilst the multi-stranded wire is wound around it. One turn of the orbital path along which the cassette is caused to travel extends axially across the radially outer surface of the outer ring portion 37 between two juxtaposed opposed pairs of the radially-outer projecting portions 44,45, then radially inwards through the radially aligned open-ended passage that extends between the respective juxtaposed pair of the ribs 38,39 of the respective one of the annular moulding parts 35, then axially through the central aperture of the stator assembly 12 between a juxtaposed pair of the radially inwardly projecting portions of the ribs 38,39 and then radially outwards through the respective one of the open-ended radial passages of the other annular moulding part 35 to complete the turn around the annular winding carrier 34.

The orbital travel of the C-shaped cassette is continued until four turns of the stranded wire have been wound side-by-side around the annular winding carrier 34 between the same two opposed pairs of the radially outer projecting portions 44,45 between the same juxtaposed pair of radially-inwardly projecting projections and through the two open-ended passages that extend therebetween on either side of the annular winding carrier 34. The cassette precesses in a circumferential direction with respect to the annular winding carrier 34 as the four windings are wound.

Once the fourth turn has been wound, wire is hooked round the hook formed by the chamfered portion of the adjacent one of the radially outer projecting portions 44,45 and the shoulder 47 at the radially outer end of that projecting portion 44,45 so that the wire is held under tension whilst the stator assembly 12 is indexed in one angular sense to move six juxtaposed opposed pairs of ribs 38,39 passed the cassette and to bring the pair of open-ended passages that are circumferentially spaced from the four turns just wound by five other such pairs of open-ended passages to the winding station. Once that sixth pair of open-ended passages has been indexed to the winding station, the cassette is caused to travel again to wind a further four turns around the stator assembly 12, those turns passing through that sixth opposed pair of open-ended passages.

The procedure by which four turns of the multi-stranded wire are wound side-by-side around the annular winding carrier 34 is repeated eight times. The portion of the wire extending from the last turn of the eighth group of turns is cut off to form one of the two leads of the respective phase of the stator winding, the other lead of that phase being the input end of the first turn of the first group of four turns.

The stator assembly 12 is then indexed in the same angular sense to bring the seventh pair of opposed open-ended passages to the winding station so that the cassette can be operated to wind four turns of the stiff wire around the annular stator assembly 12 side-by-side within those opposed pair of open-ended passages. It will be understood that the group of four turns so wound will be juxtaposed to the first group of four turns of the previously wound phase of stator windings.

The procedure is continued until six phases of groups of four turns of such stiff wire with leads at either end have been formed around the stator assembly 12, the leads at either end of the wire of each phase being juxtaposed with leads at either end of a juxtaposed phase so that all the leads are adjacent.

The wire is led through the circular path defined by the two annular arrays of radially outer projecting portions 44 and 45 as the stator assembly 12 is indexed to bring different opposed pairs of open-ended passages to the winding station. When all the windings have been wound on the stator, the leads at either end of each of the six phases of winding can be led along the circular path to the terminals to which they are to be connected.

The chamfers 46 on the radially outer projecting portions 44,45 allow the wires to be hooked around those projecting portions 44,45 and thereby kept under tension so that the wire stays positioned in the open-ended radial passages while the stator assembly 12 is turned to bring another pair of open-ended passages to the winding station. The arrangement of the chamfers 46 and the adjacent shoulders 47 provides the necessary radius for hooking the wire around.

The stator assembly 12 with the six phases of multi-stranded wire thereon is clamped in a press which presses the windings through the apertures 43 formed on either side of the stator assembly 12 between juxtaposed pairs of the ribs 38,39 and onto the layer of electrically insulating material that is bonded to both the respective annular part 35 of the annular winding carrier 34 and the annular core 33. Direct current is passed through the windings whilst a light pressure is applied to the stator assembly 12 by the press. Preferably the direct current is "pulsed" through the windings. The heat generated by passing direct current through the windings melts and cures the epoxy resin with which the multi-stranded wire and its paper wrapping is impregnated, that lies between adjacent turns of the flat spiral core assembly 33, that lines the opposed faces of the annular core 33 and which is bonded to the inner surfaces of the annular winding carrier 34 so that, when the resin melts, it seeps in-between and around the wires, the light pressure being maintained by the press until the resin has been cured. As a result, the windings are incorporated in a rigid structure imbued with both mechanical strength and electrical stress withstand strength and are constrained into the open-ended radial passages formed between the juxtaposed pairs of ribs 38,39 where they are held by the cured resin. Hence, since each of the windings is a single layer and the windings are physically constrained in the radial passages of the annular winding carrier 34 of the stator assembly 12, the axial extent by which the windings project towards the magnets 23 and 24 is minimised so that the desired dimensions of the air gap are maintained.

The thickness of the plastics material from which the two annular moulding parts 35 that are assembled together to form the annular winding carrier 34 and the material from which those annular moulding parts 35 are formed are chosen so that the annular winding carrier 34 does not bow or otherwise distort when subjected to the light pressure by the press.

The windings that are wound on the annular winding carrier 34 hold the stator assembly 12 together.

FIG. 17 shows an AC generator which has a stator assembly 12 which is similar to that of the AC generator shown in FIGS. 1 to 15. Diametrically opposed pairs of the tongues 52 that project radially inwards from the retainer rings 28 and 29 are shown engaged with opposed faces of the annular stator core 33. The stator windings 53 are shown in FIG. 17.

The principal differences between the AC generator shown in FIG. 17 and that described above with reference to and shown in FIGS. 1 to 15 relate to the form of the rotor discs which are modified to enhance airflow around them for cooling. An aperture 54 is formed in the hub portion 17A of the non-drive end rotor disc 15A. Axially extending apertures (not shown) are formed in the annular disc portion 18A of the drive end rotor disc 14A to provide a path through that rotor disc 14A for air that emerges from the radially outer side of the aperture 54 and that circulates around the radially inner portions of the stator windings 53.

A further modification which is contemplated is to make the outside diameter of the annular disc portions 18 and 19 less than the pitch circle diameter of the steps 50 of the radially outer projecting portions 44 which in turn is less than the pitch circle diameter of the steps 50 of the outer radially outwardly projecting portions 45. That modification would allow the air gaps between the permanent magnets 23 and 24 and the stator assembly 12 to be reduced which in turn would allow the thickness of those magnets 23 and 24 to be reduced without reducing the magnetic flux linkage with the stator windings 53 and with consequent savings in cost and weight which follow from the reduction in the amount of magnetic material used. There would also be a reduction in response time. Furthermore there would be a reduction in the amount of leakage flux that flows through the tongues 52.

The stator winding arrangement described above in which there are four turns of the twisted multi-stranded wire between each juxtaposed pair of radially-outer projecting portions 44, 45 is designed for higher power applications. Simple single conductor wire could be used instead of the twisted multi-stranded wire for lower power applications in which case there may be a greater number of turns of the wire (say 6 turns) between each juxtaposed pair of radially-outer projecting portions 44, 45. In addition, there may be an auxiliary winding which is provided for a certain purpose. Such an auxiliary winding may be wound over or under the single layer of turns of the stator winding arrangement or may be interleaved with the turns of the stator winding arrangement.

What is claimed is:

1. An annular winding carrier for a toroidal electrical machine, the annular carrier including a hollow cover of plastics material which is to encase an annular core of ferromagnetic material, the annular hollow cover being formed of radially inner and outer annular support portions which are joined together by at least one circular array of spaced radial ribs which extend across a respective opposed radial face of the annular core when that core is encased in the hollow annular cover and which form open ended radial passages for electrical phase windings which are wound around the annular core and the annular winding carrier so that they extend around opposed faces of the inner and outer annular support portions when the annular core is encased in the hollow annular cover and the annular winding carrier is fixed in the toroidal electrical machine.

2. Apparatus according to claim 1, wherein each rib of the hollow annular cover projects radially beyond the radially outer annular support portion, each of the radially projecting rib portions forming a hook around which a winding may be retained temporarily during winding.

3. Apparatus according to claim 2, wherein each radially projecting rib portion forms two hooks which are spaced from one another circumferentially.

4. Apparatus according to claim 1, wherein the radially inner and outer support portions are joined together by two such circular arrays of spaced radial ribs which each extend across a respective opposed radial face of the annular core when that core is encased in the hollow annular cover and the radial ribs project radially beyond the radially outer annular support portion and thereby bound an annular path which extends circumferentially around the annular winding carrier.

5. Apparatus according to claim 1, wherein the windings are held within the respective open-ended passages by being embedded within thermoset electrically insulating material.

6. A toroidal electrical machine including an outer casing, an annular winding carrier which is fixed to the outer casing and which has an annular radial face, a rotor which is rotatable within the outer casing, which is adapted to be coupled with a rotary drive member of a prime mover and which carries a circular array of alternately polarised permanent magnets on a radial face which faces the radial face of the annular winding carrier and electrical phase windings which are wound around the annular winding carrier, the annular winding carrier having a hollow annular cover of plastics material and an annular core of ferromagnetic material which is encased in the hollow annular cover, the hollow annular cover being formed of radially inner and outer annular support portions which are joined together across a first radial face of the annular core by a circular array of spaced radial ribs which form open ended radial passages, the radially inner and outer annular support portions and said circular array of spaced radial ribs bounding a respective circular array of apertures which are formed in the hollow annular cover over the first radial face of the annular core, the electrical phase windings being wound around the annular core and the annular winding carrier so that they extend radially through the open ended passages and around faces of the inner and outer annular support portions that are remote from the core.

7. A toroidal electrical machine according to claim 6, wherein the annular radial face of the annular winding carrier is one of an axially spaced pair of such annular radial faces, the radial face of the rotor that faces one of the radial faces of the annular winding carrier is one of two such radial faces, the other of the two radial faces of the rotor facing the other of the radial faces of the annular winding carrier so that the annular winding carrier is between the two radial faces of the rotor and the rotor carries two such circular arrays of alternately polarised permanent magnets, each of the circular arrays of alternately polarised magnets being on a respective one of the two radial faces of the rotor, wherein the circular array of spaced ribs which form open ended radial passages and which extend across said first radial face of the annular core and join the inner and outer annular support portions together is one of two such circular arrays of spaced ribs, the other circular array of spaced ribs also forming open ended radial passages, extending across a second radial face of the annular core, joining the inner and outer annular support portions together and bounding a respective circular array of apertures which are formed in the hollow annular cover over the second radial face of the annular core.

8. A toroidal electrical machine according to claim 7, wherein the radial ribs project radially beyond the radially outer annular support portion and thereby bound an annular path which extends circumferentially around the annular winding carrier.

9. A toroidal electrical machine according to claim 6 wherein each rib of the hollow annular cover projects radially beyond the radially outer annular support portion, each of the radially projecting rib portions forming a hook around which a winding may be retained temporarily during winding.

10. A toroidal electrical machine according to claim 9, wherein each radially projecting rib portion forms two hooks which are spaced from one another circumferentially.

11. A toroidal electrical machine according to claim 6, wherein the windings are held within the respective open-ended passages by being embedded within thermoset electrically insulating material.

12. A toroidal electrical machine according to claim 6, wherein the radial ribs are tapered inwardly so the open ended radial passages are substantially parallel sided.

13. A toroidal electrical machine according to claim 6, wherein each radial rib projects radially inwards beyond the radially inner annular support portion.

14. A toroidal electrical machine according to claim 6, wherein the windings are twisted multi-stranded.

15. A toroidal electrical machine according to claim 14, wherein the twisted multi-stranded wire is covered with insulant impregnated paper when it is being wound onto the annular winding carrier.

16. A toroidal electrical machine according to claim 14, wherein the strands of the twisted multi-stranded wire are impregnated with electrically insulating material when the multi-stranded wire is being wound onto the annular winding carrier.

17. A toroidal electrical machine according to claim 16, wherein the electrically insulating material with which the strands of the multi-stranded wire are impregnated is in powder form.

18. A toroidal electrical machine according to claim 14, wherein the windings are wound on the annular winding carrier in a single layer of juxtaposed turns.

19. A toroidal electrical machine according to claim 6, wherein the windings are arranged to provide a plurality of multiphase outputs.

20. A toroidal electrical machine according to claim 19, wherein the windings are arranged to provide a dual three phase output.

21. A toroidal electrical machine according to claim 19, wherein the windings of each phase are wound on the annular winding carrier in groups of juxtaposed turns, each group being spaced circumferentially from the juxtaposed group of that phase by a group of juxtaposed turns of each other phase.

22. A toroidal electrical machine according to claim 21, wherein there are the same number of turns in each group of turns of each winding of each phase.

23. A toroidal electrical machine according to claim 21, wherein the spaced groups of juxtaposed turns of multiple multiphase windings are arranged so that pairs of leads at the end of all the windings are adjacent one to another.

24. An annular winding carrier for a toroidal electrical machine, the carrier including a hollow annular cover of plastics material which is to encase an annular core of ferromagnetic material, the annular hollow cover being formed of radially inner and outer annular support portions which are joined together by at least one circular array of spaced radial ribs which extend across a respective opposed radial face of the annular core when that core is encased in the hollow annular cover and which form open ended radial passages for electrical phase windings which are wound around the annular core and the annular winding carrier so that they extend around opposed faces of the inner and outer annular support portions when the annular core is encased in the hollow annular cover and the annular winding carrier is fixed in the toroidal electrical machine, the radially inner and outer annular support portions and said at least one circular array of spaced radial ribs bounding a respective circular array of apertures which are formed in the hollow annular cover.

* * * * *